United States Patent
Prabhakar

(10) Patent No.: US 10,628,795 B1
(45) Date of Patent: Apr. 21, 2020

(54) ARTICULATION, AGGREGATION, AND PEER REVIEW OF ACCOMPLISHMENTS

(71) Applicant: TRI DIMENSIONAL SOLUTIONS INC., Clayton, MO (US)

(72) Inventor: Mayank Prabhakar, Clayton, MO (US)

(73) Assignee: TRI DIMENSIONAL SOLUTIONS INC., Clayton, MO (US)

( * ) Notice: Subject to any disclaimer, the term of this patent is extended or adjusted under 35 U.S.C. 154(b) by 441 days.

(21) Appl. No.: 15/153,203

(22) Filed: May 12, 2016

Related U.S. Application Data

(60) Provisional application No. 62/161,697, filed on May 14, 2015.

(51) Int. Cl.
G06Q 10/00 (2012.01)
G06Q 10/10 (2012.01)
G06Q 50/00 (2012.01)

(52) U.S. Cl.
CPC ......... *G06Q 10/1053* (2013.01); *G06Q 50/01* (2013.01)

(58) Field of Classification Search
CPC .... G06Q 10/101; G06Q 10/06; G06Q 10/103; G06Q 50/01; G06Q 10/063114; G06Q 30/018; G06Q 10/063118; G06Q 10/06313
See application file for complete search history.

(56) References Cited

U.S. PATENT DOCUMENTS

| | | | |
|---|---|---|---|
| 4,671,772 A | 6/1987 | Slade et al. | |
| 6,253,202 B1 * | 6/2001 | Gilmour | G06F 17/3061 |
| 7,219,301 B2 | 5/2007 | Barrie et al. | |
| 2002/0161602 A1 * | 10/2002 | Dougherty | G06Q 10/103 |
| | | | 705/80 |
| 2003/0097410 A1 * | 5/2003 | Atkins | H04L 29/06 |
| | | | 709/206 |
| 2007/0288851 A1 | 12/2007 | Barrie et al. | |
| 2008/0301142 A1 * | 12/2008 | Marolf | G06Q 10/06 |
| 2009/0204465 A1 * | 8/2009 | Pradhan | G06Q 10/06 |
| | | | 705/7.17 |
| 2012/0226701 A1 | 9/2012 | Singh | |
| 2013/0117203 A1 * | 5/2013 | Malka | G06Q 10/067 |
| | | | 706/12 |
| 2013/0132864 A1 | 5/2013 | Panigrahi et al. | |
| 2014/0129573 A1 | 5/2014 | Dewaal | |
| 2015/0293924 A1 | 10/2015 | Singh | |
| 2016/0071121 A1 | 3/2016 | Gestetner et al. | |

FOREIGN PATENT DOCUMENTS

WO 2014028628 A2 2/2014

* cited by examiner

*Primary Examiner* — Gabrielle A McCormick
(74) *Attorney, Agent, or Firm* — Armstrong Teasdale LLP

(57) ABSTRACT

An accomplishment aggregation and review computing device configured for enabling articulation, aggregation, and peer review of accomplishments reported by people is provided. Additionally, a method and a computer-readable storage medium having computer-executable instructions embodied thereon for enabling articulation, aggregation, and peer review of accomplishments reported by people are provided.

17 Claims, 13 Drawing Sheets

ARTICULATION, AGGREGATION, AND PEER REVIEW OF ACCOMPLISHMENTS

CROSS REFERENCE TO RELATED APPLICATIONS

This application claims priority to U.S. Provisional Patent Application No. 62/161,697, filed on May 14, 2015, the entire disclosure of which is hereby incorporated by reference in its entirety.

FIELD OF USE

The disclosed subject matter relates to database and file management for multiple computers in a digital data processing system and, more particularly, to organizing and storing information contained in data signals to enable articulation, aggregation, and peer review of information from multiple participants to provide a unified community view of reported accomplishments in a networked environment.

BACKGROUND

Current social media platforms primarily target people-to-people connections. The focus is on being "connected" to others and reaching out to as many people as possible, the aim being to broadcast a job profile and provide subjective feedback through reviews of knowledge tags indicating an area of expertise. Additionally, networking platforms allow people to either post new job requirements or look for jobs.

Further to the above, in conventional systems, information about human endeavor and accomplishments is not being captured in a uniform manner, on an open platform. People work in teams to accomplish significant tasks and complete challenging projects, but there is no single repository or catalog to gather and hold details regarding the who, what, when, where, why, or how of these accomplishments.

BRIEF DESCRIPTION OF THE DISCLOSURE

In one aspect, an accomplishment aggregation and review computing device configured for enabling articulation, aggregation, and peer review of accomplishments reported by people is provided. The accomplishment aggregation and review computing device includes a processor in communication with a memory. The processor is configured to receive an accomplishment signal from a first client computing device, wherein the accomplishment signal includes a description of at least a first accomplishment of a first person and a first facet associated with the first accomplishment. The processor is additionally configured to identify at least a second person associated with the first accomplishment, transmit an invitation signal to a second client computing device associated with the second person to review the description and provide feedback regarding the accomplishment, receive a feedback signal from the second client computing device, wherein the feedback signal includes the feedback, and represent the feedback in association with the first accomplishment.

In another aspect, a method for enabling articulation, aggregation, and peer review of accomplishments reported by people is provided. The method is implemented by an accomplishment aggregation and review computing device that includes a processor in communication with a memory. The method includes receiving, by the accomplishment aggregation and review computing device, an accomplishment signal from a first client computing device, wherein the accomplishment signal includes a description of at least a first accomplishment of a first person and a first facet associated with the first accomplishment. The method additionally includes identifying, by the accomplishment aggregation and review computing device, at least a second person associated with the first accomplishment, transmitting, by the accomplishment aggregation and review computing device, an invitation signal to a second client computing device associated with the second person to review the description and provide feedback regarding the accomplishment, receiving, by the accomplishment aggregation and review computing device, a feedback signal from the second client computing device, wherein the feedback signal includes the feedback, and representing, by the accomplishment aggregation and review computing device, the feedback in association with the first accomplishment.

In yet another aspect, a computer-readable storage medium having computer-executable instructions embodied thereon is provided. When executed by an accomplishment aggregation and review computing device including at least one processor coupled to a memory, the computer-executable instructions cause the accomplishment aggregation and review computing device to receive an accomplishment signal from a first client computing device, wherein the accomplishment signal includes a description of at least a first accomplishment of a first person and a first facet associated with the first accomplishment. The instructions additionally cause the accomplishment aggregation and review computing device to identify at least a second person associated with the first accomplishment, transmit an invitation signal to a second client computing device associated with the second person to review the description and provide feedback regarding the accomplishment, receive a feedback signal from the second client computing device, wherein the feedback signal includes the feedback, and represent the feedback in association with the first accomplishment.

BRIEF DESCRIPTION OF THE DRAWINGS

FIG. 1 is a diagram of an example environment in which an accomplishment aggregation and review system receives and transmits signals with client computing devices of users in accordance with one example embodiment of the present disclosure.

FIG. 2 is a simplified block diagram of the accomplishment aggregation and review system in communication with a plurality of client computing devices in accordance with one example embodiment of the present disclosure.

FIG. 3 is an expanded block diagram of a server architecture of the accomplishment aggregation and review system and the plurality of client computing devices in accordance with one example embodiment of the present disclosure.

FIG. 4 illustrates a configuration of a client system shown in FIGS. 2 and 3 in accordance with one example embodiment of the present disclosure.

FIG. 5 illustrates a configuration of a server system shown in FIGS. 2 and 3 in accordance with one example embodiment of the present disclosure.

FIG. 6 is a diagram of a relationship between an account associated with a user, a profile of the user, and accomplishments of the user in accordance with one example embodiment of the present disclosure.

FIG. 7 is a flowchart of a process for creating a new project, in accordance with an example embodiment of the present disclosure.

FIG. 8 is a flowchart of a process for updating a project, in accordance with another example embodiment of the present disclosure.

FIG. 9 is a flowchart of a process for merging projects, in accordance with an example embodiment of the present disclosure.

FIG. 10 is a flowchart of a process for receiving feedback from a user regarding one or more projects, in accordance with an example embodiment of the present disclosure.

FIG. 11 is a flowchart of a process for responding to a search request from a user, in accordance with another example embodiment of the present disclosure.

FIG. 12 is a flowchart of an example process implemented by the accomplishment aggregation and review system for enabling peer verification of one or more accomplishments reported by a person, in one example embodiment of the present disclosure.

FIG. 13 is a diagram of components of one or more example computing devices that may be used in the system shown in FIG. 2.

DETAILED DESCRIPTION OF THE DISCLOSURE

Figure 1:
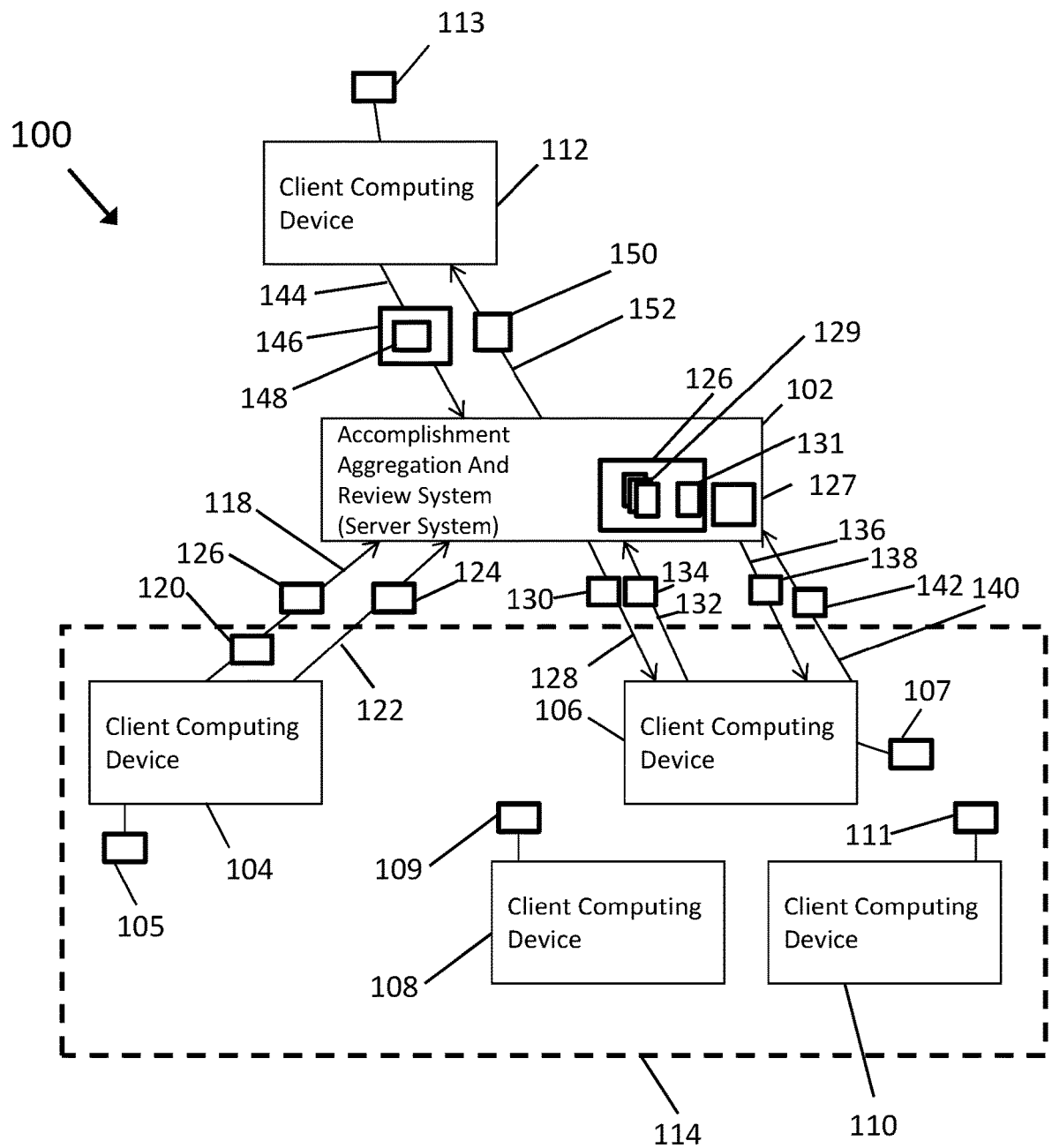
FIGS. 1-13 show example embodiments of the methods and systems described herein.

The system described herein provides a platform that enables people to describe their project to the rest of the world in a standardized, precise, and searchable manner, while allowing each project participant to decide with whom they choose to share this information. Rather than focusing on people-to-people connections, the system described herein focuses on work performed, as a quantifiable, measurable entity, and people are just one facet of a project. The system enables users (e.g., project participants) to articulate quantifiable data sets for the different facets of a project (the who, what, when, where, why, and how) in order to create a clear, concise view of the project, then to obtain such information from multiple participants of a project and build a unified community view for the project by transmitting, receiving, and processing data signals using a network of computing devices.

The system collects the above information in an open, transparent platform that gives the users the power to decide to whom and when to make project information available. The system is capable of searching for projects based on clearly defined data points. Accordingly, by enabling a user to search based on multiple project facets, a user is able to easily find projects and participants in the projects that have been done in the past and/or are currently being pursued in the world.

The methods and systems described herein may be implemented using computer programming or engineering techniques including computer software, firmware, hardware or any combination or subset thereof, wherein the technical effect is achieved by performing at least one of: (a) receiving an accomplishment signal from a first client computing device, wherein the accomplishment signal includes a description of at least a first accomplishment of a first person and a first facet associated with the first accomplishment; (b) identifying at least a second person associated with the first accomplishment; (c) transmitting an invitation signal to a second client computing device associated with the second person to review the description and provide feedback regarding the accomplishment; (d) receiving a feedback signal from the second client computing device, wherein the feedback signal includes the feedback; and (e) representing the feedback in association with the first accomplishment.

More specifically, an accomplishment aggregation and review system described herein is specially programmed with computer code to perform the above processes. The technical effects described herein apply to the technical field of processing data transmitted through computer networks. The systems and methods described herein provide the technical advantage of enabling the quality of data pertaining to accomplishments of people to be searched, viewed, verified, and added to or otherwise modified, by other users of a computer network, thereby increasing the availability and accuracy of such data in a networked environment. The systems and methods also provide the technical advantage of providing a centralized searchable database of accomplishments that people have made and enabling more efficient use of networking resources by enabling users to more efficiently search for and locate other people who have worked on specific problems and found solutions to the problems. Accordingly, the systems and methods described herein solve a technical problem (i.e., the inability of users of a computer network to quickly and efficiently access, view, and edit data pertaining to accomplishments) by providing a technical solution rooted in computer technology (i.e., providing a computer architecture that allows users of multiple computing devices to search, view, verify, and modify data pertaining to accomplishments in a computer-network environment).

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to enabling peer verification of user-submitted data in a variety of contexts.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a diagram of an example environment 100 in which an accomplishment aggregation and review system 102 receives and transmits signals with client computing devices of users in accordance with one example embodiment of the present disclosure. More specifically, a first client computing device 104 associated with a first user 105 transmits an accomplishment signal 118 to accomplishment aggregation and review system 102. Accomplishment signal 118 includes an accomplishment 126 associated with first user 105. For example, and as described in more detail herein, accomplishment 126 includes a description of the accomplishment, including one or more facets of the accomplishment, including team members ("participants") who were involved in the accomplishment 126 with the first user 105. The term "accomplishment" is sometimes referred to as a "project" herein. In some implementations, first client computing device 104 additionally transmits a profile 120 of first user 105 to accomplishment aggregation and review system 102. In addition, in at least some implementations, first client computing device 104 transmits an access rights signal 122 that includes access rights 124 defining whether one or more accomplishments (e.g., accomplishment 126) are available for viewing by other people. For example, in some implementations, other participants identified in association with a description of a project have access to view and provide feedback (e.g., ratings, comments, and/or edits) to the description of the accomplishment, while members of the general public are unable to provide feedback on, and in some implementations, even view the description of a particular accomplishment. Accomplishment aggregation and review system 102 stores the accomplishment 126 as data in memory (e.g., a database), for example alongside data associated with at least a second accomplishment 127. Accordingly, aggregation and review system 102 organizes accomplishment 126 and data associated with accomplishment 126 into a specific data structure, and stores the generated data structure in memory for later retrieval and processing, as described herein. For example, aggregation and review system 102 transmits at least portions of the data to other users as described herein. Further, and as described in more detail herein, accomplishment aggregation and review system 102 modifies data pertaining to one or more accomplishments based on feedback received from other users.

Accomplishment aggregation and review system 102 identifies participants 114 included in the description of at least one accomplishment (e.g., accomplishment 126) and transmits invitation signals to each of them. The participants include a second user 107 associated with a second client computing device 106, a third user 109 associated with a third client computing device 108, and a fourth user 111 associated with a fourth client computing device 110. More specifically, for example, accomplishment aggregation and review system 102 transmits an invitation signal 128 that includes an invitation 130 to second client computing device 106, associated with second user 107. In at least some implementations, invitation 130 is an electronic message, for example an email, that includes a link that, when activated, instructs second client computing device 106 to transmit a request signal 132 including a request 134 for the description of the accomplishment 126, to accomplishment aggregation and review system 102. In response, accomplishment aggregation and review system 102 transmits a first description signal 136 including a first description 138 of the project 126 to second client computing device 106. In at least some implementations, accomplishment aggregation and review system 102 transmits first description 136 as a "view" such as an individual view or a community view, such that accomplishment aggregation and review system 102 controls one or more computing devices (e.g., first and second client computing devices 104 and 106) and causes the one or more computing devices to display first description 136. First description 136 may be transmitted with corresponding viewing and editing rights, for example depending on access rights 124 and whether the recipient is a creator of the accomplishment 126, a participant in the accomplishment 126, or general member of the public. Additionally, an accomplishment (e.g., accomplishment 126) may be assigned public or private status, depending on access rights 124. Second client computing device 106 transmits a feedback signal 140 including feedback 142 that represents edits and/or approval or disapproval (e.g., a rating) to one or more aspects of description 138. For example, second user 107 may provide an edited description of an achievement associated with the accomplishment 126, and/or provide a rating or approval of the accomplishment.

Additionally, in at least some implementations, if second user 107 does not already have an account registered with accomplishment aggregation and review system 102, then accomplishment aggregation and review system 102 enables second user 107 to register an account with accomplishment aggregation and review system 102, including, for example, transmitting a profile of second user 107 to accomplishment aggregation and review system 102. Accomplishment aggregation and review system 102 performs a similar process for third user 109 and fourth user 111, who are also identified as participants 114 in the project 126.

A fifth user 113, who is associated with a fifth client computing device 112, is not identified as a participant in the project 126 by any of first user 105, second user 107, third user 109, and fourth user 111. Rather, fifth user 113 is a member of the general public who performs a search for people having a particular skill set, for example experience using one or more technologies associated with the project 126 that first user 105, second user 107, third user 109, and fourth user 111 participated in. More specifically, fifth client computing device 110 transmits a search signal 144 including a search query 146 that includes one or more search terms 148. Accomplishment aggregation and review system 102 receives the search terms 148, matches one or more of the search terms to accomplishment 126, and transmits a second description signal 152 that includes a second description 150 of the accomplishment 126 and/or of participants 114. In at least some implementations, second description 150 differs from first description 138 due to access rights 124 associated with the accomplishment 126 and/or the fact that fifth user 113 is a member of the general public rather than being a participant 114 in the accomplishment 126.

An accomplishment (e.g., accomplishment 126) has a plurality of facets or components of data. For example, accomplishment 126 includes a name facet, that defines the name of the accomplishment ("project"), or committee the team (i.e., participants 114) uses or used while implementing the project. Additionally, the project 126 has a visibility of project facet (e.g., access rights 124). For example, the visibility may be public, meaning a community view of the project 126 is visible to users who are not participants in the project 126, or may be private, meaning the community view can be viewed by a non-participant only if one of the participants 114 has granted permission for the non-participant to view the community view. Additionally, the project 126 includes a company or entity name facet that defines the entity the project 126 was executed for or with (e.g., ACME Inc.). Further, the project 126 includes a location facet that defines one or more geographic locations (e.g., city and state) where the project was executed. Additionally, the project 126 includes a project time period facet that defines a best guess of when the project started and ended. Further, the project 126 includes a facet that defines each participant's time period of involvement with the project 126. In addition, the project 126 includes an employment type facet, defining each participant's employment status for the project (e.g., employee, contract, employee to contract, or contract to employee). Additionally, the project 126 includes a role facet that specifies each participant's role with respect to the project (e.g., developer, architect, etc.). Further, the project 126 includes a type facet, defining the type of project (e.g., marketing, IT, audits, etc.). Additionally, the project 126 includes an industry type facet, defining the type of industry the project is associated with (e.g., retail, health care, etc.).

Additionally, project 126 includes a tools used facet that defines the most essential and relevant, industry-recognized tools, products, techniques, and processes that each participant 114 used to execute the project 126. For example, for a sample information technology project, the tools used may include Java, C++, .NET, Servlets, MVC, Struts, Oracle DB, Microsoft Windows, Unix, etc. For a marketing project, the tools used may include email campaigns, click stream analytics, etc. In addition, the project 126 includes a project objective facet that defines the reason behind the project or the problem the that project was intended to solve (e.g., a problem statement), using industry standard terminology and, at least in some implementations, subjective input to further define the objective. In at least some implementations, accomplishment aggregation and review system 102 transmits a recommendation to a participant 114 populating or editing this facet to input multiple objectives to capture as much information as possible regarding the purpose of the project. An example information technology project objective is to achieve connectivity with external partners (e.g., to create a B2B partner gateway).

Additionally, project 126 includes an achievements facet that defines what was done or built to meet the project objective and, if applicable, notes on artifacts that were built, processes that were defined, and metrics or measurable items that were achieved along the way. Information in the accomplishments facet is objective and uses industry-wide terms and acronyms. Additionally, the achievements facet includes an individual achievements component that defines the parts of the project achievement that a particular participant 114 was involved in executing personally. An example achievements facet for a project is "SFTP gateway setup in order to achieve B2B data transfer; ESB (enterprise service bus) solution implemented to allow for publication of information from external partners to multiple internal listeners."

Furthermore, project 126 includes a project members facet defining a set of project members (e.g., participants 114) who were involved in the project. The project members facet includes member names, member roles, contact email addresses, phone numbers and extensions, quantitative ratings, and qualitative reviews. For example, in at least some implementations, users choose from pre-written, qualitative descriptions of a member's particular strengths, and/or provide a brief description of their own.

With regard to views, accomplishment aggregation and review system 102 uses data relating to the facets described above to create a new individual view of the project and update the community view of the project. A plurality of individual views or private views 129 each holds all the information a respective user has shared with this platform regarding a respective project (e.g., first project 126). The private view remains private to the user and is not shared with any other project participant or external viewer (users who have been granted view access but are not project participants) unless the user expressly allows it. The user may add, delete, or modify information he or she has added into his or her individual view at any time. While in the individual view, accomplishment aggregation and review system 102 prompts the user to accept, reject, or rate information that has been added to the community view by other project participants.

A community view 131 for a project (e.g., project 126) is the source of peer verified information regarding the project. More specifically, accomplishment aggregation and review system 102 generates a community view that is based on all of the information associated with individual views for the project. In particular, the community view shows peer verified information in a way that makes it clear that the information has been reviewed by multiple project participants 114, thereby making it easier to identify the portions of information from the participants that have been verified. Accordingly, the quality of the data provided by accomplishment aggregation and review system 102 is improved over data provided by conventional systems.

Accomplishment aggregation and review system 102 implements a peer review process to obtain data quality ratings. More specifically, accomplishment aggregation and review system 102 prompts project participants (e.g., participants 114) to agree, decline, or rate the information entered by other participants. The more participants agree to a specific bit of information, the higher it is rated in the community view. In at least some implementations, accomplishment aggregation and review system 102 does not reveal which participants agreed or disagreed with each piece of information.

As described above, a user may choose to make a project public or private (e.g., access rights 124). If a project is public, accomplishment aggregation and review system 102 makes the project information searchable and visible to external project viewers without restrictions. On the other hand, if a project is private, accomplishment aggregation and review system 102 disables viewing by external viewers unless they have specific permission. However, accomplishment aggregation and review system 102 still makes the project searchable. Any external viewer (e.g., fifth user 113) wishing to view a private project will need to transmit a request to one of the participants 114 to be granted access to view the project. However, an external viewer may only receive access to the community view or the private view (if allowed) of the project participant (e.g., second user 107) who accepted the request. The external viewer does not obtain access to information about other project participants if those participants have expressly disallowed their names to be made visible to external viewers. In such a circumstance, the external viewer (e.g., fifth user 113) would need to transmit requests for access to those project participants individually.

As described above, accomplishment aggregation and review system 102 enables users (e.g., fifth user 113) to search for projects based on one or more project facets. Accomplishment aggregation and review system 102 displays results for all projects that match the search query, but information displayed to the searching user may be limited based on project privacy settings (e.g., access rights 124). Public projects are available to view without requesting specific permission for one of the project participants. In the case of private projects, if the individual searching is not a project participant, they will need to request permission from one of the existing project participants (e.g., through a request for information mechanism) to view project details. In at least some implementations, certain project aspects are not searchable (i.e., searching by company name to obtain a list of all projects done at a specific company). In at least some implementations, searches for individuals by name does not return all of the projects in which they are a participant, but the search results do display limited profile information and provide a way for the viewing user to contact the individual to request a connection. The user executing the search may then ask for permission to see community views of the projects of their new connection.

In at least some implementations, accomplishment aggregation and review system 102 maintains audits to indicate when every piece of information was added, deleted, or modified. Accomplishment aggregation and review system 102 stores audit records for data ratings from project participants 114, searches performed, invitations transmitted to external viewers, and views transmitted to external viewers (e.g., fifth user 113) in memory. For example, audit records, searches performed, invitations transmitted, and views transmitted may be stored as part of the data structure of the associated accomplishment.

Accomplishment aggregation and review system 102 will link a social networking profile associated with each user to the projects that each user was a participant in. Additionally, accomplishment aggregation and review system 102 will generate a list of the projects that each user has participated in. Accomplishment aggregation and review system 102 additionally enables users to see views of the projects they were participants in. Similar to social networking sites, accomplishment aggregation and review system 102 enables users to search for other users, connect to other users, and communicate with other users.

In at least some implementations, accomplishment aggregation and review system 102 provides anonymity to users. In some implementations, the anonymity is within a project participant list. For example, accomplishment aggregation and review system 102 receives a selection from a project participant (e.g., second user 107) regarding whether to show their name to an external viewer (e.g., fifth user 113) who has been granted access to the community view by another project participant (e.g., third user 109). In addition, accomplishment aggregation and review system 102 does not share a user's entries in their private view for a project with any other users. Furthermore, in at least some implementations, accomplishment aggregation and review system 102 does not share a user's reviews of other participants. More specifically, while accomplishment aggregation and review system 102 uses the above information to rate data and create participant ratings, accomplishment aggregation and review system 102 does not reveal what information was provided by which participant.

As described in more detail herein, accomplishment aggregation and review system 102 enables separate users to create projects independently and describe the same project. Accomplishment aggregation and review system 102 locates such project descriptions associated with the same project and merges them together. In addition, accomplishment aggregation and review system 102 enables a user to define a project in which the user is the only participant.

Figure 2:
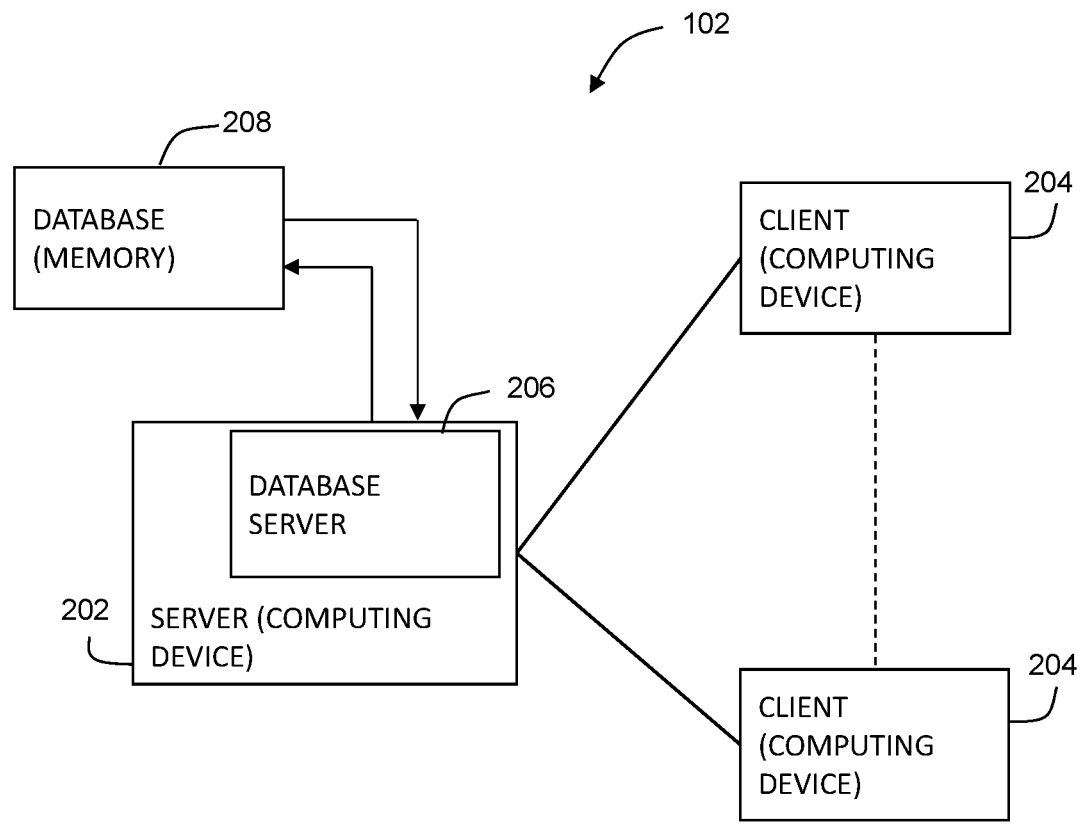

FIG. 2 is a simplified block diagram of the accomplishment aggregation and review system 102 in communication with a plurality of client computing devices 204. In the example embodiment, accomplishment aggregation and review system 102 includes a accomplishment aggregation and review server computing device 202 coupled to a plurality of client subsystems 204, also referred to as client systems 204 or client computing devices. Client subsystems 204 are representative of, for example, first client computing device 104, second client computing device 106, third client computing device 108, fourth client computing device 110, and fifth client computing device 112 (FIG. 1). In one embodiment, client systems 204 are computers including a web browser, such that accomplishment aggregation and review server computing device 202 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a mobile computing device, such as a notebook computer, a web-based phone, a personal digital assistant (PDA), or other web-connectable equipment. A database server 206 is connected to a database 208 containing information on a variety of matters, as described below in greater detail. In one embodiment database 208 is stored on accomplishment aggregation and review server computing device 202 and may be accessed by potential users at one of client systems 204 by logging onto accomplishment aggregation and review server computing device 202 through one of client systems 204. In any alternative embodiment, database 208 is stored remotely from accomplishment aggregation and review server computing device 202 and may be non-centralized.

Figure 3:
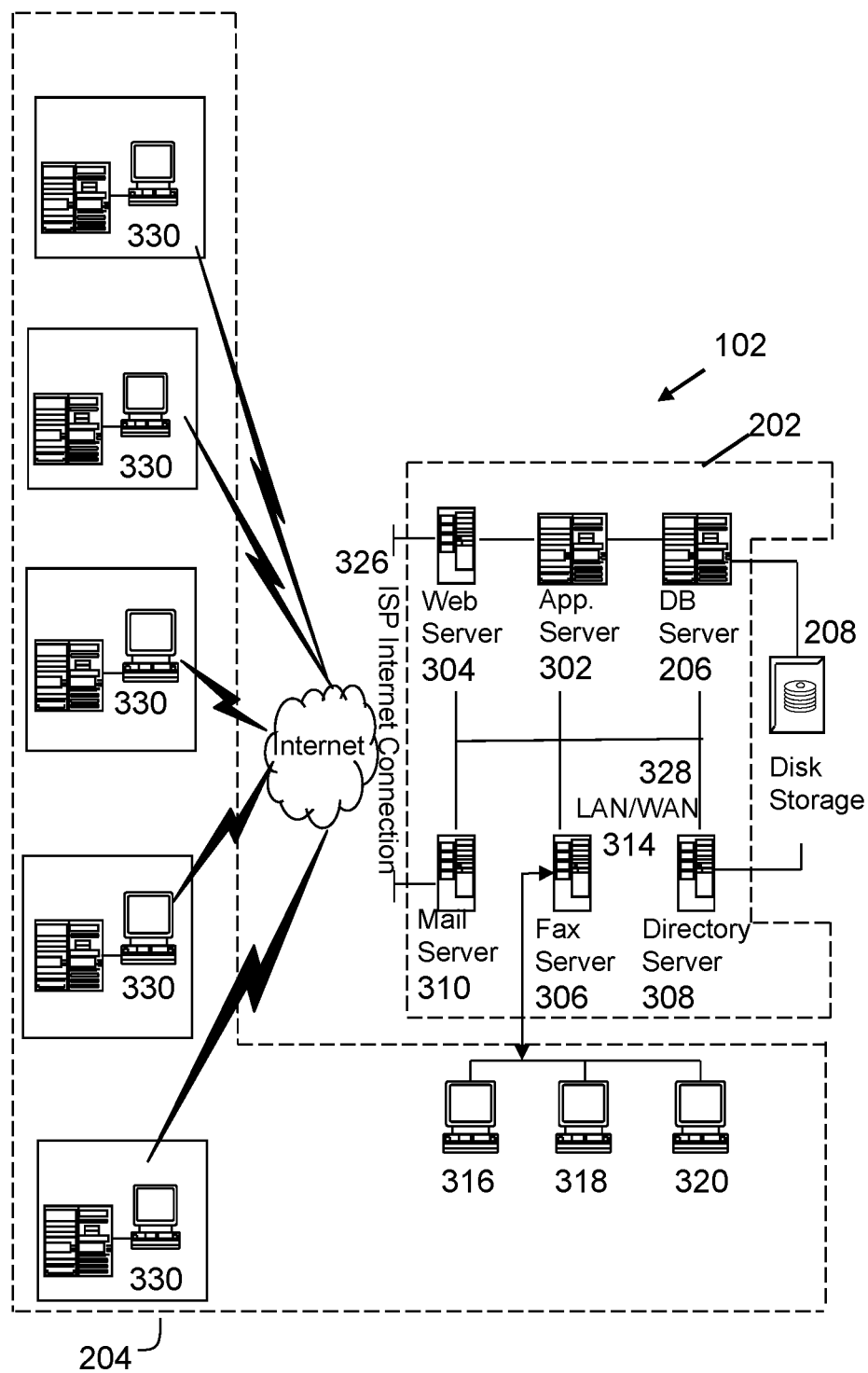

FIG. 3 is an expanded block diagram of an example embodiment of a server architecture of accomplishment aggregation and review system 102 in accordance with one embodiment of the present disclosure. Accomplishment aggregation and review system 102 includes accomplishment aggregation and review server computing device 202 and client systems 204. Accomplishment aggregation and review system 102 additionally includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Accomplishment aggregation and review server computing device 202 is configured to be communicatively coupled to various entities using an Internet connection 326. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 102. At least one of the client systems includes a workstation 330 located at a remote location. Workstations 330 include, for example, personal computers having a web browser. Furthermore, fax server 306 communicates with remotely located client systems, including a client system 332, using a telephone link. Fax server 306 is configured to communicate with other client systems 316, 318, and 320 as well.

Figure 4:
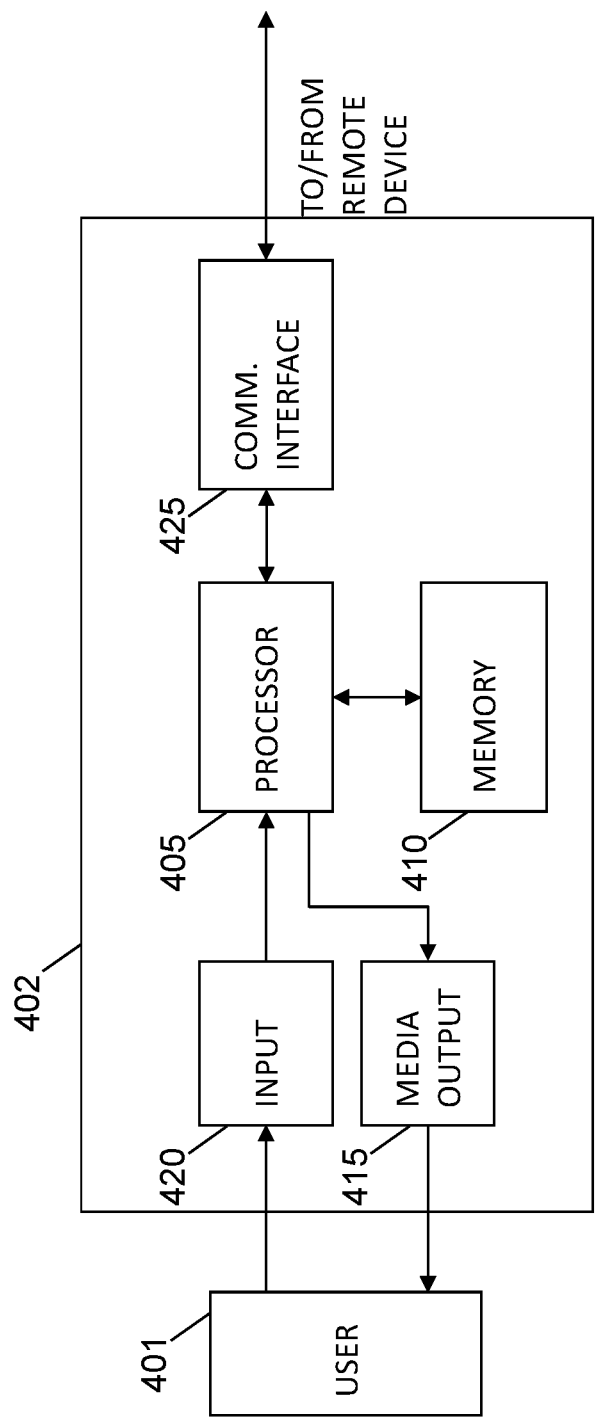

FIG. 4 illustrates an example configuration of a client computing device 402. Client computing device 402 may include, but is not limited to, client systems ("client computing devices") 204, 316, 318, 320, and 330 (shown in FIG. 3).

Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to a user 401. Media output component 415 is any component capable of conveying information to user 401. In some embodiments, media output component 415 includes an output adapter such as a video adapter and/or an audio adapter. An output adapter is operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Client computing device 402 may also include a communication interface 425, which is communicatively coupleable to a remote device such as server system 202. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and/or a client application.

Figure 5:
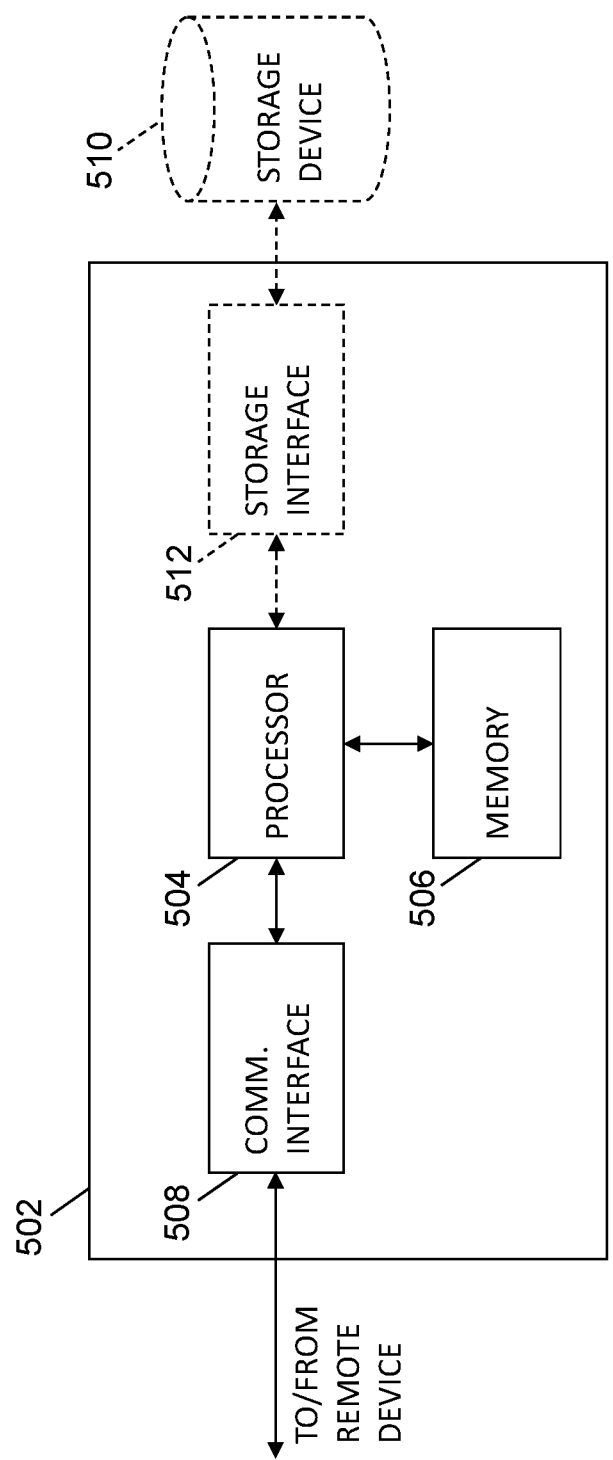

FIG. 5 illustrates an example configuration of a server computing device 502. Server computing device 502 is representative of accomplishment aggregation and review server computing device 202 (shown in FIGS. 2 and 3), database server 206, application server 302, web server 304, fax server 306, directory server 308, and/or mail server 310.

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as client computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
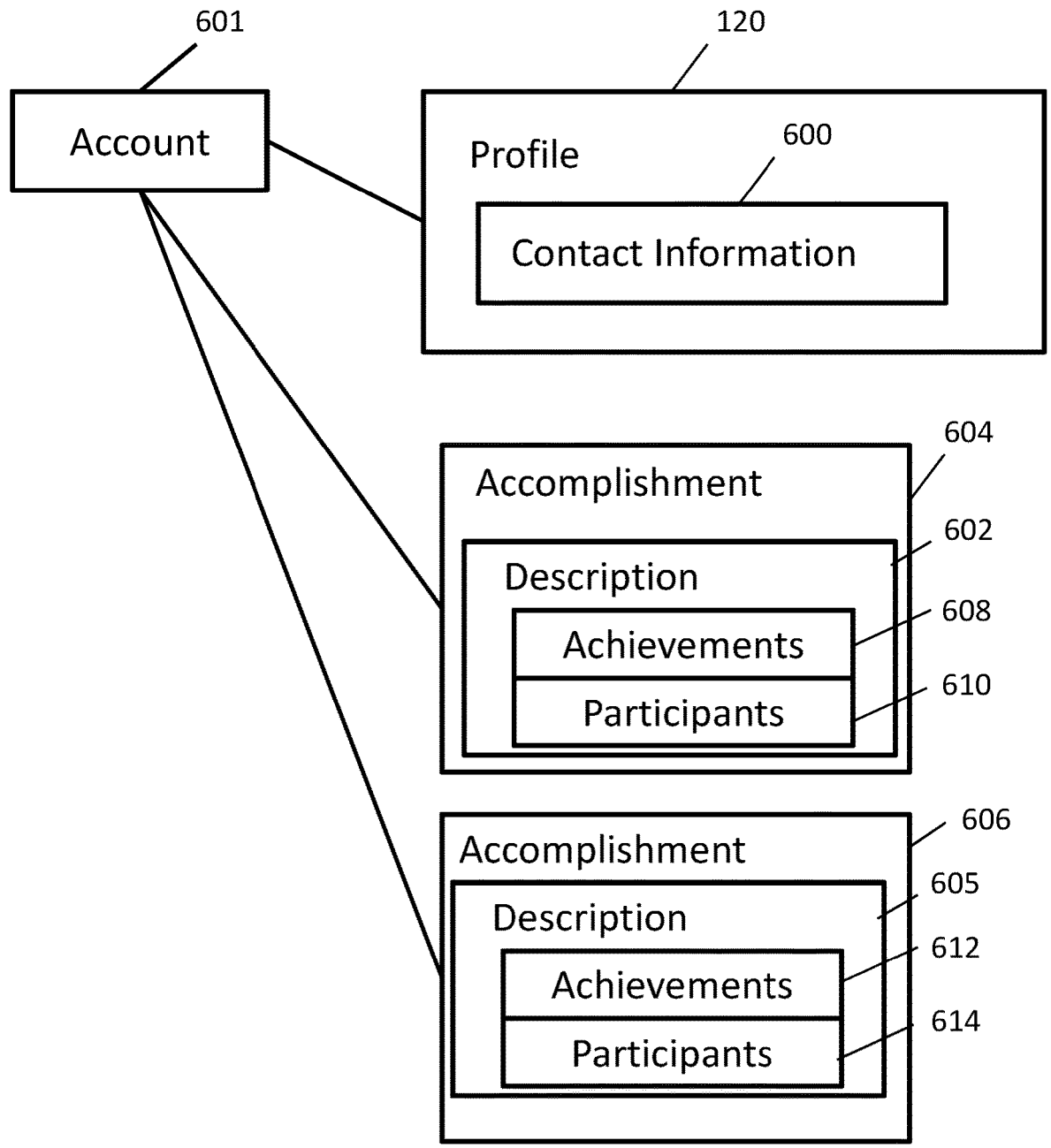

FIG. 6 is a diagram of an account 601 (e.g., an account associated with first user 105) linked to a profile 120 and multiple accomplishments of first user 105. Profile 120 includes a contact information component 600 that includes contact information, such as name, email address, and/or phone number of a user (e.g., first user 105). First accomplishment 604 has an associated description component 602 that includes information regarding one or more facets of first accomplishment 604. First accomplishment 604 is, for example, representative of first accomplishment 126 (FIG. 1). The facets include, for example, one or more achievements 608 (e.g., achievements facet) and information on participants 610 (e.g., team members facet) in first accomplishment 604. Likewise, second accomplishment 606 is associated with a second description 605 that includes information regarding facets of second accomplishment 606, including for example, one or more achievements 612 (e.g., achievements facet) and information on participants 614 (e.g., team members facet) in second accomplishment 606. In other implementations, profile 120 has a different configuration and description 602 may include a different number of accomplishments and/or set of facets.

Figure 7:
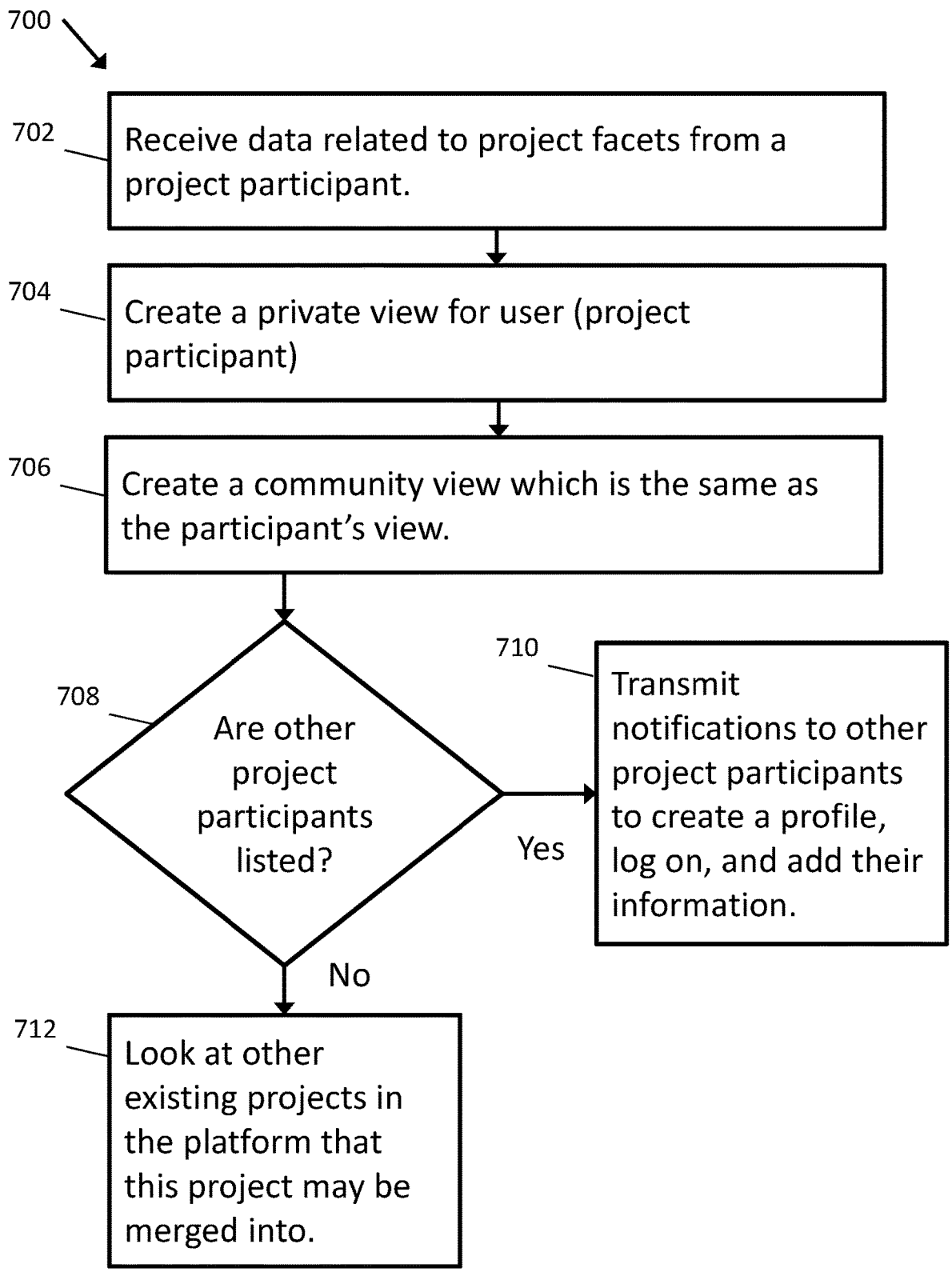

FIG. 7 is a flowchart of a process 700 for creating a new project, in accordance with an example embodiment of the present disclosure. Initially, accomplishment aggregation and review system 102 receives 702 data related to project facets from a project participant. For example, accomplishment aggregation and review system 102 receives profile 120 from first user 105 describing first project 126. Additionally, accomplishment aggregation and review system 102 creates 704 a private view 129 of the project for the user (e.g., first user 105). Additionally, accomplishment aggregation and review system 102 creates 706 a community view 131, which is the same as the participant's (e.g., first user 105) view. Further, accomplishment aggregation and review system 102 determines 708 whether other project participants are listed (i.e., identified in the team members facet 610). If accomplishment aggregation and review system 102 determines that there are other project participants listed, then accomplishment aggregation and review system 102 transmits 710 notifications (e.g., invitations 130) to the other project participants 114 to create a profile, log on, and add their information. If accomplishment aggregation and review system 102 determines that there are not other project participants listed, then accomplishment aggregation and review system 102 compares 712 the newly created project to other existing projects (e.g., second project 127) that the newly created project should be merged into.

Figure 8:
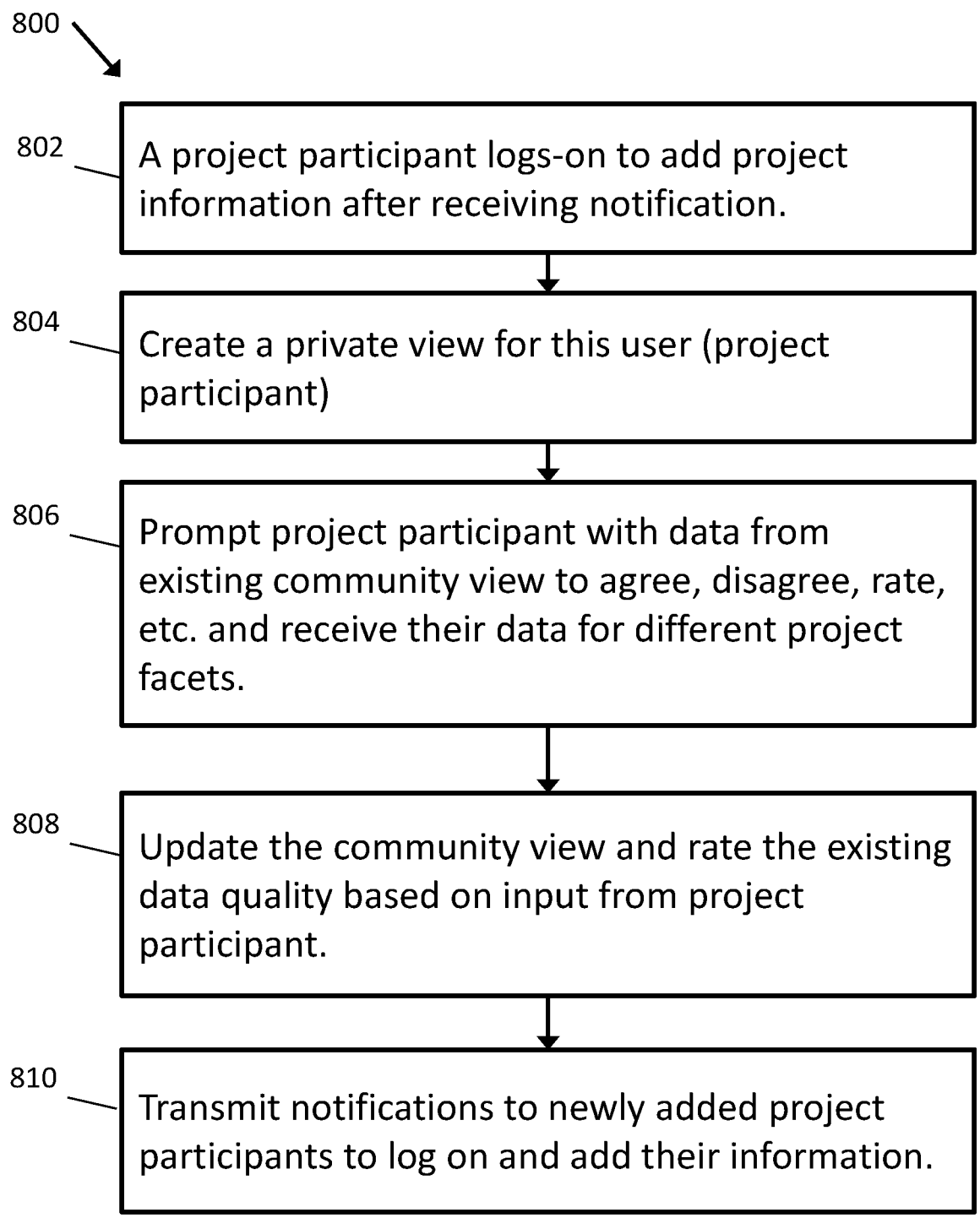

FIG. 8 is a flowchart of a process 800 for updating a project (e.g., first project 126), in accordance with another example embodiment of the present disclosure. Initially, a project participant 114 (e.g., second user 107) logs on 802 to accomplishment aggregation and review system 102 to add project information after receiving a notification (e.g., invitation 130). Additionally, accomplishment aggregation and review system 102 creates 804 a private view for this user (e.g., second user 107) who is a project participant 114. Additionally, accomplishment aggregation and review system 102 prompts 806 the project participant (e.g., second user 107) with data from the existing community view 131 to agree, disagree, and/or rate and receive their data for different project facets (e.g., accomplishments 608, team members 610, tools used, etc.). Additionally, accomplishment aggregation and review system 102 updates 808 the community view 131 and rates the existing data quality based on the input from the project participant (e.g., second user 107). That is, accomplishment aggregation and review system 102 controls one or more computing devices (e.g., first and second client computing devices 104 and 106) and causes the one or more computing devices to display the updated community view 131. Further, accomplishment aggregation and review system 102 transmits 810 notifications (e.g., invitations 130) to any newly added project participants 114 to log on and add their information.

Figure 9:
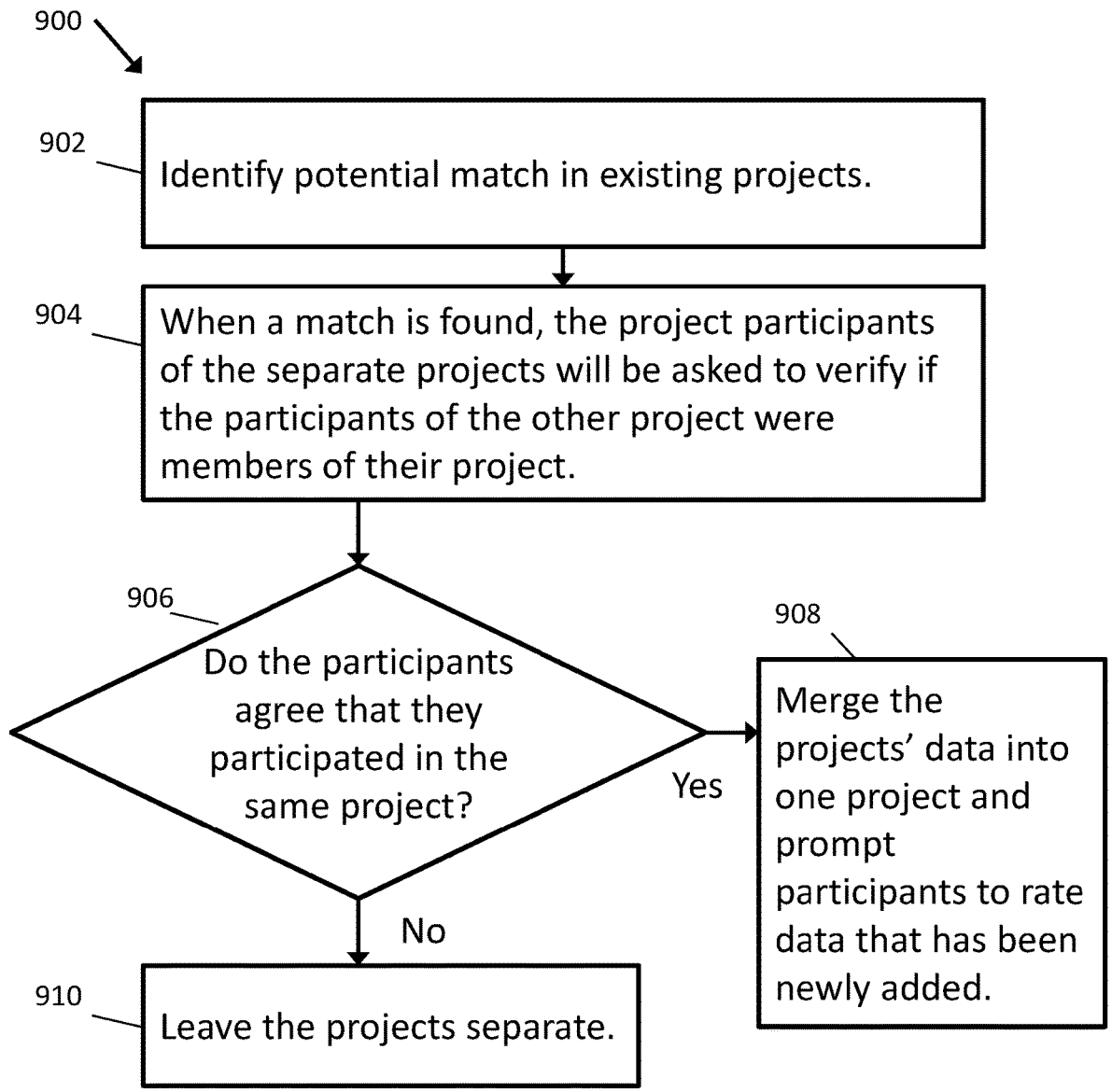

FIG. 9 is a flowchart of a process 900 for merging projects, in accordance with an example embodiment of the present disclosure. Initially, accomplishment aggregation and review system 102 identifies 902 a potential match in existing projects. For example, accomplishment aggregation and review system 102 determines that one or more facets of first project 126 are similar to one or more facets of second project 127 by comparing words in the facets of first project 126 with words in the facets of second project 127, determining a similarity score representing the percentage of similar words, and determining that the similarity score is greater than a predefined threshold. When accomplishment aggregation and review system 102 identifies 904 a potential match in projects, accomplishment aggregation and review system 102 transmits a prompt to the project participants 114 on the separate projects (e.g., first project 126 and second project 127) to verify if the participants of the respective other project were members of their project. Additionally, accomplishment aggregation and review system 102 determines 906 whether the participants 114 agree that they participated in the same project, for example by receiving responses transmitted from each participant and determining whether a predefined threshold number or percentage of the responses are yes. If accomplishment aggregation and review system 102 determines that the participants 114 agree that they participated in the same project, accomplishment aggregation and review system 102 merges 908 the data from the two projects (e.g., first project 126 and second project 127) into one project (e.g., first project 126) and prompts the participants to rate data that has been newly added. If, however, accomplishment aggregation and review system 102 determines that the project participants do not agree that they participated in the same project, then accomplishment aggregation and review system 102 leaves 910 the projects separate.

Figure 10:
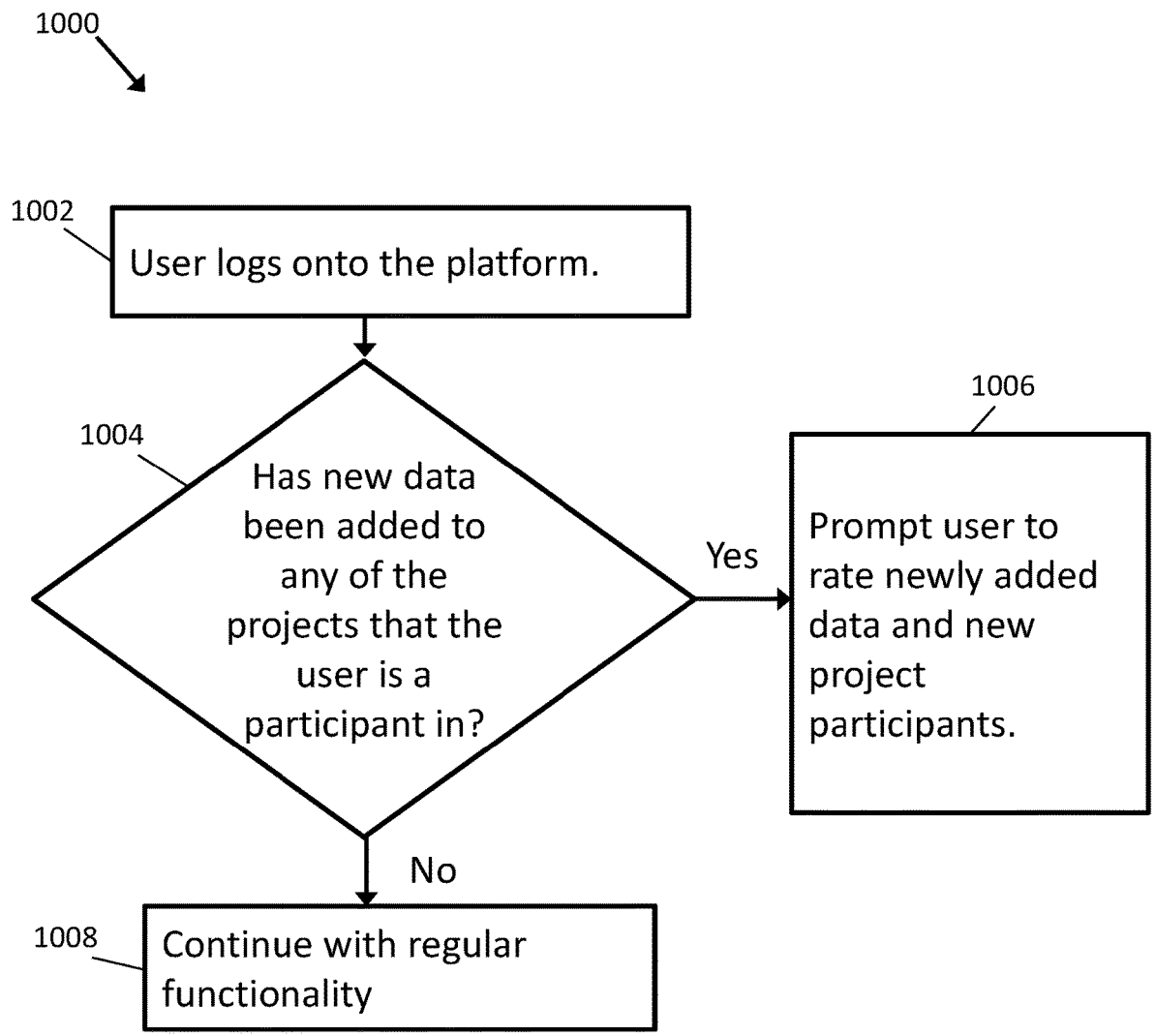

FIG. 10 is a flowchart of a process 1000 for receiving feedback from a user regarding one or more projects, in accordance with an example embodiment of the present disclosure. Initially, a user (e.g., second user 107) logs on 1002 to accomplishment aggregation and review system 102. Additionally, accomplishment aggregation and review system 102 determines 1004 whether new data has been added to any of the projects that the user is a participant in. If accomplishment aggregation and review system 102 determines that new data has been added for one or more such projects, then accomplishment aggregation and review system 102 prompts 1006 the user to rate the newly added data and potentially identify new project participants. If, however, accomplishment aggregation and review system 102 determines that no new data has been added for such projects, then accomplishment aggregation and review system 102 continues 1008 on with regular functionality.

Figure 11:
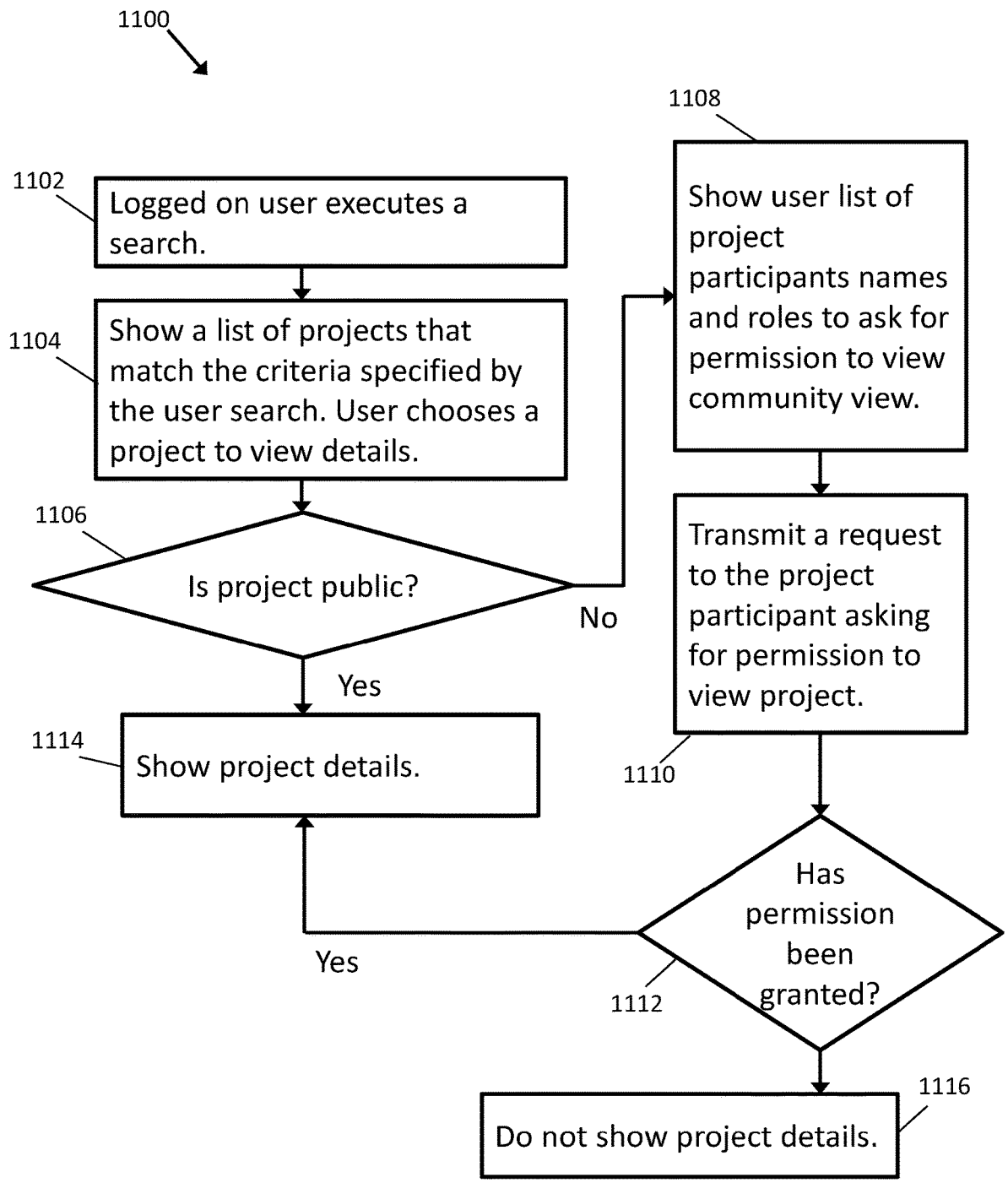

FIG. 11 is a flowchart of a process 1100 for responding to a search request from a user, in accordance with another example embodiment of the present disclosure. Initially, a logged on user executes 1102 a search (i.e., accomplishment aggregation and review system 102 receives search query 146). Additionally, accomplishment aggregation and review system 102 shows (i.e., transmits) 1104 a list of projects that match the criteria specified by the user search (e.g., the search terms 148) to the user. The user chooses a project to view details of the project (i.e., accomplishment aggregation and review system 102 receives a selection signal from fifth client computing device 112). Further, accomplishment aggregation and review system 102 determines 1106 whether the project is public, for example by referencing access rights 124. If accomplishment aggregation and review system 102 determines that the project is not public, then accomplishment aggregation and review system shows (i.e., transmits) 1108 the user a list of project participants names and roles to ask for permission to view the community view 131 for the project. Next, accomplishment aggregation and review system 102 transmits 1110 a request to a project participant selected by the user (e.g., fifth user 113) for permission to view the project. Next, accomplishment aggregation and review system 102 determines 1112 whether permission has been granted. If accomplishment aggregation and review system 102 determines that permission has been granted, then accomplishment aggregation and review system 102 shows (i.e., transmits) 1114 the project details (i.e., the community view 131) to the requesting user (e.g., fifth user 113). That is, accomplishment aggregation and review system 102 controls one or more computing devices (e.g., a computing device operated by fifth user 113) and causes the one or more computing devices to display the community view 131. Likewise, if the project is public, then accomplishment aggregation and review system 102 transmits the projects details (e.g., community view 131) to the requesting user (e.g., fifth user 113). If, however, permission is not granted, then accomplishment aggregation and review system 102 does not 1116 show the project details to the requesting user (e.g., fifth user 113).

Figure 12:
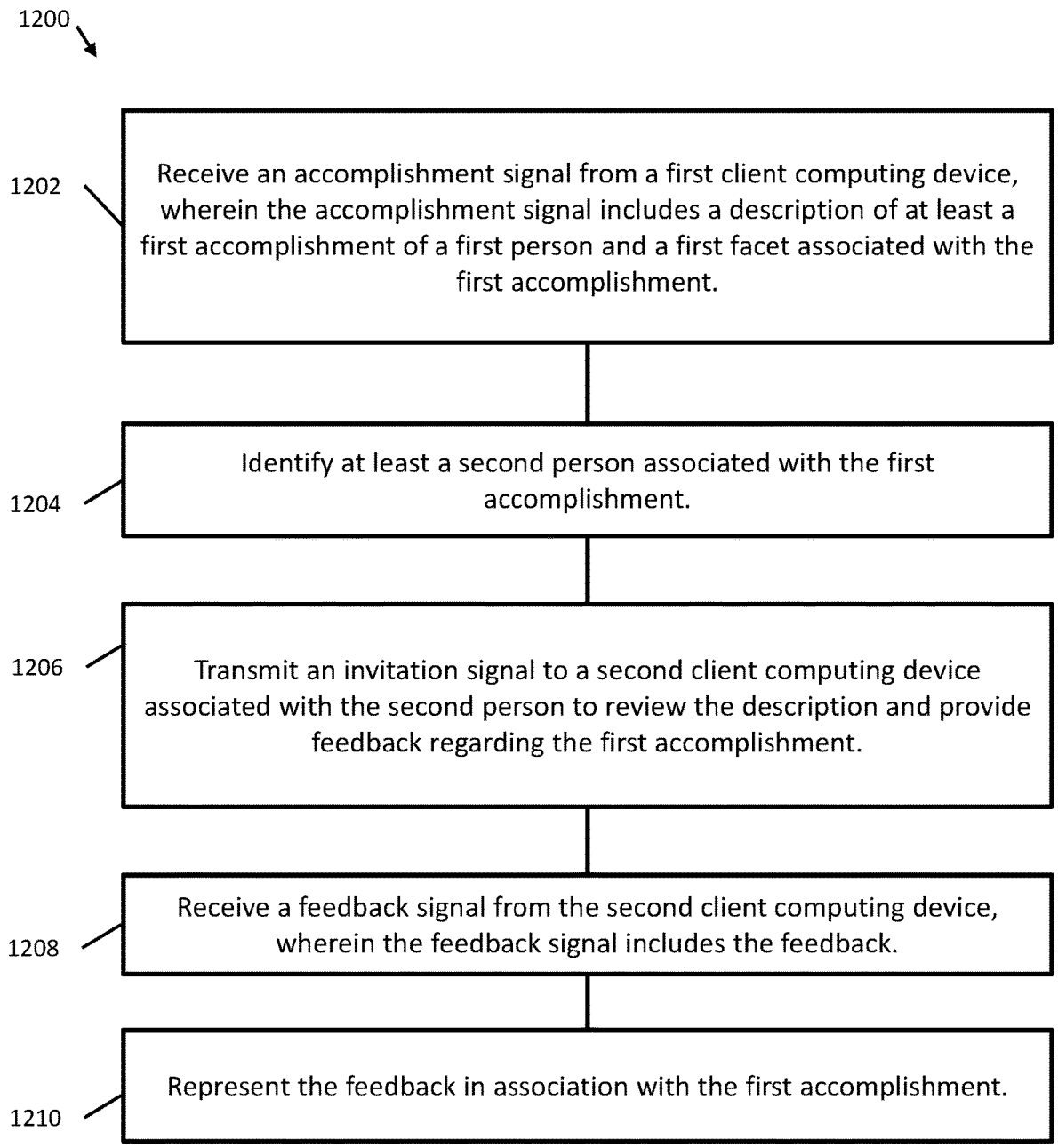

FIG. 12 is a flowchart of an example process 1200 implemented by accomplishment aggregation and review system 102 for enabling peer verification of one or more accomplishments reported by a person (e.g., first user 105). Initially, accomplishment aggregation and review system 102 receives 1202 an accomplishment signal 118 from a first client computing device 104, wherein the accomplishment signal 118 includes a description 602 of at least a first accomplishment 126 of a first person (e.g., first user 105) and a first facet 608 associated with the first accomplishment 126. Additionally, accomplishment aggregation and review system 102 identifies 1204 at least a second person (e.g., second user 107) associated with the first accomplishment (e.g., first accomplishment 126). Additionally, accomplishment aggregation and review system 102 transmits 1206 an invitation signal 128 to a second client computing device 106 associated with the second person (e.g., second user 107) to review the description 602 and provide feedback 142 regarding the first accomplishment 126. Further, accomplishment aggregation and review system 102 receives 1208 a feedback signal 140 from the second client computing device 106, wherein the feedback signal 140 includes the feedback 142. Additionally, accomplishment aggregation and review system 102 represents 1210 the feedback 142 in association with the accomplishment 126 (e.g., by causing one or more computing device to display feedback 142 on a community page 131 associated with the first accomplishment 126).

In some implementations, the accomplishment aggregation and review system 102 identifies the second person 107 by receiving contact information (e.g., in the team members facet 610) for the second person (e.g., second user 107) from the first person (e.g., first user 105). In some implementations, the accomplishment aggregation and review system 102 stores access rights 124 associated with the first accomplishment 126 (e.g., as part of a data structure associated with first accomplishment 126), receives a request (e.g., search query 146) from a third client computing device (e.g., client computing device 112) associated with a third person (e.g., user 113) to view the description 602 of the first accomplishment 126, determine that the access rights 124 permit the third person (e.g., user 113) to view the description of the first accomplishment 126, and transmits the description (e.g., as a community view 131) of the first accomplishment 126 to the third client computing device (client computing device 112).

In some implementations, the accomplishment aggregation and review system 102 determines that the access rights 124 enable the third person to make a modification to the description of the first accomplishment 126 (e.g., by adding to one or more facets of the first accomplishment 126), receives a proposed modification to the description of the first accomplishment from the third person, and applies the modification to the description of the first accomplishment. In some implementations, the accomplishment aggregation and review system 102 receives a proposed modification to the description of the first accomplishment from a person other than the first person (e.g., second user 107), transmits the proposed modification to the first person (e.g., first user 105), for example in the first person's private view 129, receives approval of the proposed edit from the first person, and applies the proposed modification to the description of the first accomplishment (e.g., applies it to the community view 131). In other implementations, the system applies the modification to the community view without requiring approval from another user.

In some implementations, the description is a first description, and the accomplishment aggregation and review system 102 receives a second description of a second accomplishment 127 from a person other than the first person (e.g., second user 107), determines that the second accomplishment 127 is the first accomplishment 126, and merges the second description with the first description (e.g., merges the second accomplishment 127 with the first accomplishment 126). In some implementations, merging the descriptions includes appending one description to another description. Additionally, in some implementations, merging includes merging descriptions from different users of the system who are not, at least initially, registered as participants or invitees associated with the same project or accomplishment in the system. In some implementations, the accomplishment aggregation and review system 102 receives an indication from the first user 105 that the profile 120 of the first user 105 should not be publicly viewable and prevents the profile 120 of the first user from being viewed by members of the public except in response to receiving a search query 146 that includes one or more terms included in the profile of the first user, or one or more terms included in descriptions of one or more accomplishments of the first user. In some implementations, the accomplishment aggregation and review system 102 identifies a plurality of people as a community (e.g., participants 114) associated with the first accomplishment and generates a community view 131 of the first accomplishment 126 that enables the community (e.g., participants 114) to view and modify (e.g., add to) the description.

Figure 13:
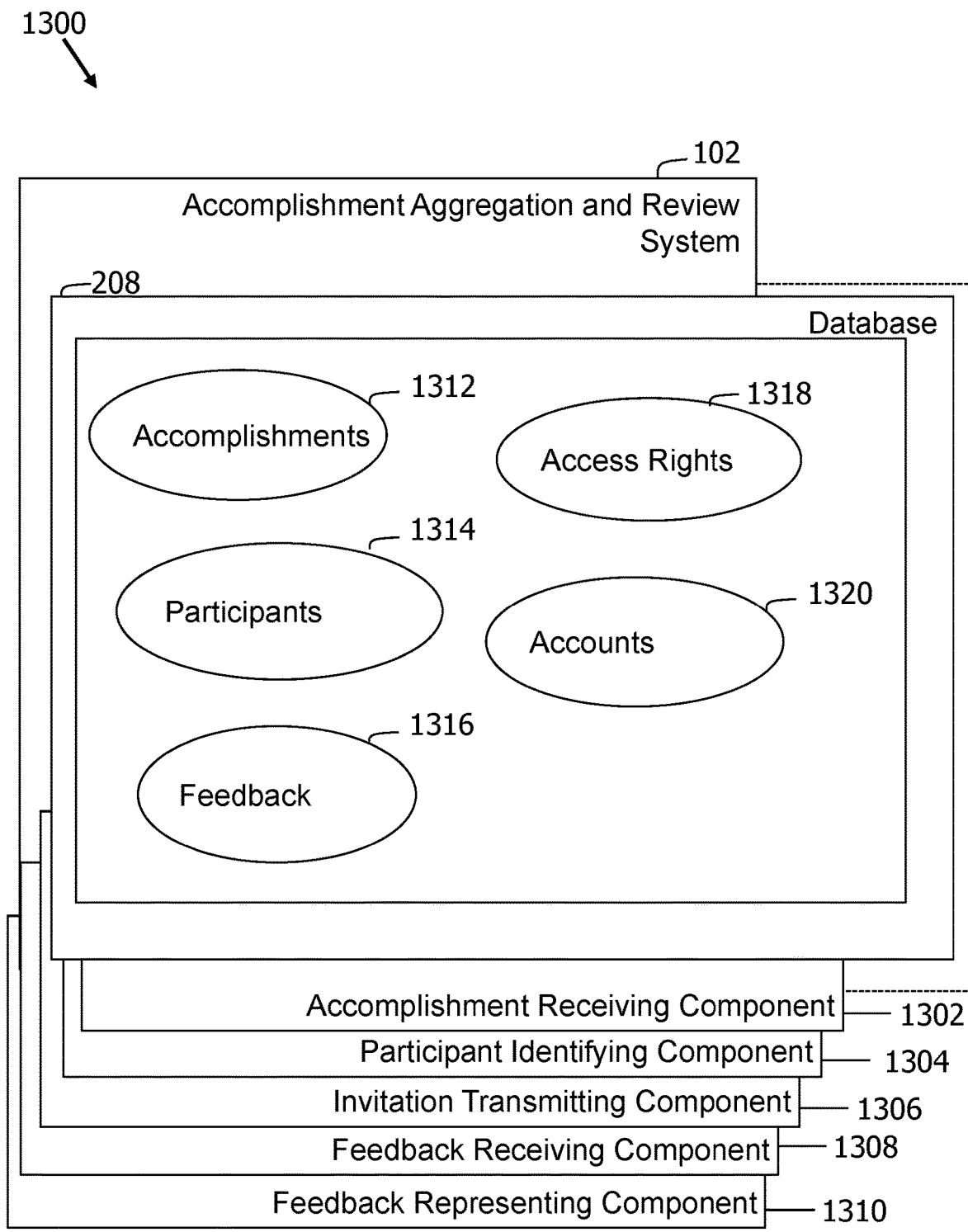

FIG. 13 is a diagram 1300 of components of one or more example computing devices, for example accomplishment aggregation and review system 102, that may be used in embodiments of the described systems and methods. FIG. 13 further shows a configuration of data in database 208. Database 208 is in communication with several separate components within accomplishment aggregation and review system 102, which perform specific tasks.

Accomplishment aggregation and review system 102 includes an accomplishment receiving component 1302 for receiving an accomplishment signal from a first client computing device, wherein the accomplishment signal includes a description of at least a first accomplishment of a first person and a first achievement associated with the first accomplishment. Additionally, accomplishment aggregation and review system 102 includes a participant identifying component 1304 for identifying at least a second person associated with the first accomplishment. Further, accomplishment aggregation and review system 102 includes an invitation transmitting component 1306 for transmitting an invitation signal to a second computing device associated with the second person to review the description of the first accomplishment and provide feedback regarding the first accomplishment. Additionally, accomplishment aggregation and review system 102 includes a feedback receiving component 1308 for receiving a feedback signal from the second computing device, wherein the feedback signal includes the feedback. Further, accomplishment aggregation and review system 102 includes a feedback representing component 1310 for representing the feedback in association with the first accomplishment.

In an example embodiment, data in database 208 is divided into a plurality of sections, including but not limited to, a accomplishments section 1312, a participants section 1314, a feedback section 1316, an access rights section 1318, and an accounts section 1320. These sections stored in database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described embodiments of a method and system for enabling articulation, aggregation, and peer review of accomplishments reported by people provide a platform for gathering and holding details regarding who worked on a project, what the project was, when the project was executed, where the project was executed, why the project was performed, and how the project was completed. As a result, methods and systems described herein dramatically improve collective understanding of human accomplishments, bringing together people working on similar problems and/or people who have already solved similar problems before. Further, the methods and systems described herein improve existing computer technology by enabling the quality of data pertaining to accomplishments of people to be searched, viewed, verified, and added to or otherwise modified, by other users of a computer network, thereby increasing the availability and accuracy of such data in a networked environment. The systems and methods also provide the technical advantage of providing a centralized searchable database of accomplishments that people have made and enabling more efficient use of networking resources by enabling users to more efficiently search for and locate other people who have worked on specific problems and found solutions to the problems. Accordingly, the systems and methods described herein solve a technical problem (i.e., the inability of users of a computer network to quickly and efficiently access, view, and edit data pertaining to accomplishments) by providing a technical solution rooted in computer technology (i.e., providing a computer architecture that allows users of multiple computing devices to search, view, verify, and modify data pertaining to accomplishments in a computer-network environment).

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An accomplishment aggregation and review computing device configured for enabling articulation, aggregation, and peer review of accomplishments reported by people, said accomplishment aggregation and review computing device including a processor in communication with a memory, said processor is configured to:
   receive an accomplishment signal from a first client computing device associated with a first person, wherein the accomplishment signal includes a description from the first person of at least a first previously completed accomplishment of the first person and a first facet associated with the first accomplishment, wherein the first facet includes at least a second person associated with the first accomplishment;
   organize the description of the first accomplishment and the first facet associated with the first accomplishment into a first specific data structure, wherein the first specific data structure defines a community view of the first accomplishment;
   store the first specific data structure in the memory;
   organize the description of the first accomplishment and the first facet associated with the first accomplishment into a second specific data structure that defines a private view associated with the first person, the private view including all information that the first person has provided regarding the first accomplishment, wherein the private view is not accessible to anyone other than the first person;
   identify the second person associated with the first accomplishment from the first facet included in the accomplishment signal;
   transmit an invitation signal to a second client computing device associated with the second person, wherein the invitation signal includes an electronic message including a link;
   receive a request signal from the second client computing device, the request signal generated by the second client computing device in response to the second person activating the link in the invitation signal, the request signal including a request for the description of the first accomplishment;

in response to receiving the request signal, generate and transmit a first description signal to the second client computing device, the first description signal including the description of the first accomplishment;

receive, in response to the first description signal, a feedback signal from the second client computing device, wherein the feedback signal includes feedback from the second person regarding the description of the first accomplishment;

update the description in the first specific data structure for the first accomplishment based on the feedback received in the feedback signal, thereby updating the community view of the first accomplishment, wherein the resulting updated community view includes peer verified information generated based on both the description from the first person and the feedback from the second person, wherein the resulting updated community view indicates that the peer verified information has been reviewed by multiple participants in the first accomplishment, and wherein the community view is distinct from the private view associated with the first person;

generate a second description signal based on the updated community view; and transmit the second description signal to an additional client computing device to cause the updated community view to be displayed on the additional client computing device.

2. The accomplishment aggregation and review computing device of claim 1, further configured to identify the second person from contact information for the second person that is included in the first facet.

3. The accomplishment aggregation and review computing device of claim 1, further configured to:
store access rights associated with the first accomplishment;
receive a request from a third client computing device associated with a third person to view the description of the first accomplishment;
determine that the access rights permit the third person to view the description of the first accomplishment; and
transmit the description of the first accomplishment to the third client computing device.

4. The accomplishment aggregation and review computing device of claim 3, further configured to:
determine that the access rights enable the third person to make a modification to the description of the first accomplishment;
receive a proposed modification to the description of the accomplishment from the third person; and
apply the modification to the description of the first accomplishment.

5. The accomplishment aggregation and review computing device of claim 3, further configured to:
receive a proposed modification to the description of the first project from a person other than the first person;
transmit the proposed modification to the first person;
receive approval of the proposed modification from the first person; and
apply the proposed modification to the description of the first project.

6. The accomplishment aggregation and review computing device of claim 1, wherein the description is a first description, said accomplishment aggregation and review computing device is further configured to:
receive a second description of a second accomplishment from a person other than the first person;
determine that the second accomplishment is the first accomplishment by:
calculating a similarity score representing a percentage of similar words between the first description and the second description;
determining the similarly score is greater than a predefined threshold;
transmitting a prompt to participants for the first accomplishment and the second accomplishment; and
receiving, in response to the prompt, a predetermined number of responses from the participants that indicate the first accomplishment is the same as the second accomplishment; and
merge the description of the second accomplishment with the description of the first accomplishment.

7. The accomplishment aggregation and review computing device of claim 1,
wherein the description from the first person further includes a second facet that defines the second person's time period of involvement with the first accomplishment.

8. A method for enabling articulation, aggregation, and peer review of accomplishments reported by people, said method is implemented by an accomplishment aggregation and review computing device that includes a processor in communication with a memory, said method comprising:
receiving, by the accomplishment aggregation and review computing device, an accomplishment signal from a first client computing device associated with a first person, wherein the accomplishment signal includes a description from the first person of at least a first previously completed accomplishment of the first person and a first facet associated with the first accomplishment, wherein the first facet includes at least a second person associated with the first accomplishment;
organizing the description of the first accomplishment and the first facet associated with the first accomplishment into a first specific data structure, wherein the first specific data structure defines a community view of the first accomplishment;
storing the first specific data structure in the memory;
organizing the description of the first accomplishment and the first facet associated with the first accomplishment into a second specific data structure that defines a private view associated with the first person, the private view including all information that the first person has provided regarding the first accomplishment, wherein the private view is not accessible to anyone other than the first person;
identifying, by the accomplishment aggregation and review computing device, the second person associated with the first accomplishment from the first facet included in the accomplishment signal;
transmitting, by the accomplishment aggregation and review computing device, an invitation signal to a second client computing device associated with the second person, wherein the invitation signal includes an electronic message including a link;
receiving a request signal from the second client computing device, the request signal generated by the second client computing device in response to the second person activating the link in the invitation signal, the request signal including a request for the description of the first accomplishment;

in response to receiving the request signal, generating and transmitting a first description signal to the second client computing device, the first description signal including the description of the first accomplishment;

receiving, in response to the first description signal, by the accomplishment aggregation and review computing device, a feedback signal from the second client computing device, wherein the feedback signal includes feedback from the second person regarding the description of the first accomplishment;

updating, by the accomplishment aggregation and review computing device, the first specific data structure for the first accomplishment based on the feedback received in the feedback signal, thereby updating the community view of the first accomplishment, wherein the resulting updated community view includes peer verified information generated based on both the description from the first person and the feedback from the second person, wherein the resulting updated community view indicates that the peer verified information has been reviewed by multiple participants in the first accomplishment, and wherein the community view is distinct from the private view associated with the first person;

generate a second description signal based on the updated community view; and transmit the second description signal to an additional client computing device to cause the updated community view to be displayed on the additional client computing device.

9. The method of claim 8, further comprising identifying the second person from contact information for the second person that is included in the first facet.

10. The method of claim 8, further comprising:
storing access rights associated with the first accomplishment;
receiving a request from a third client computing device associated with a third person to view the description of the first accomplishment;
determining that the access rights permit the third person to view the description of the first accomplishment; and
transmitting the description of the first accomplishment to the third client computing device.

11. The method of claim 10, further comprising:
determining that the access rights enable the third person to make a modification to the description of the first accomplishment;
receiving a proposed modification to the description of the accomplishment from the third person; and
applying the modification to the description of the first accomplishment.

12. The method of claim 10, further comprising:
receiving a proposed modification to the description of the first project from a person other than the first person;
transmitting the proposed modification to the first person;
receiving approval of the proposed modification from the first person; and
applying the proposed modification to the description of the first project.

13. The method of claim 8, wherein the description is a first description, said method further comprising:
receiving a second description of a second accomplishment from a person other than the first person;
determining that the second accomplishment is the first accomplishment; and
merging the description of the second accomplishment with the description of the first accomplishment.

14. A computer-readable storage medium having computer-executable instructions embodied thereon, wherein when executed by an accomplishment aggregation and review computing device including at least one processor coupled to a memory, the computer-executable instructions cause the accomplishment aggregation and review computing device to:

receive an accomplishment signal from a first client computing device associated with a first person, wherein the accomplishment signal includes a description from the first person of at least a first previously completed accomplishment of the first person and a first facet associated with the first accomplishment, wherein the first facet includes at least a second person associated with the first accomplishment;

organize the description of the first accomplishment and the first facet associated with the first accomplishment into a first specific data structure, wherein the first specific data structure defines a community view of the first accomplishment;

store the first specific data structure in the memory;

organize the description of the first accomplishment and the first facet associated with the first accomplishment into a second specific data structure that defines a private view associated with the first person, the private view including all information that the first person has provided regarding the first accomplishment, wherein the private view is not accessible to anyone other than the first person;

identify the second person associated with the first accomplishment from the first facet included in the accomplishment signal;

transmit an invitation signal to a second client computing device associated with the second person, wherein the invitation signal includes an electronic message including a link;

receive a request signal from the second client computing device, the request signal generated by the second client computing device in response to the second person activating the link in the invitation signal, the request signal including a request for the description of the first accomplishment;

in response to receiving the request signal, generate and transmit a first description signal to the second client computing device, the first description signal including the description of the first accomplishment;

receive, in response to the first description signal, a feedback signal from the second client computing device, wherein the feedback signal includes feedback from the second person regarding the description of the first accomplishment;

update the description in the first specific data structure for the first accomplishment based on the feedback received in the feedback signal, thereby updating the community view of the first accomplishment, wherein the resulting updated community view includes peer verified information generated based on both the description from the first person and the feedback from the second person, wherein the resulting updated community view indicates that the peer verified information has been reviewed by multiple participants in the first accomplishment, and wherein the community view is distinct from the private view associated with the first person;

generate a second description signal based on the updated community view; and transmit the second description signal to an additional client computing device to cause the updated community view to be displayed on the additional client computing device.

15. The computer-readable storage medium of claim 14, wherein said computer-readable instructions additionally cause the accomplishment aggregation and review computing device to identify the second person from contact information for the second person that is included in the first facet.

16. The computer-readable storage medium of claim 14, wherein said computer-readable instructions additionally cause the accomplishment aggregation and review computing device to:
   store access rights associated with the first accomplishment;
   receive a request from a third client computing device associated with a third person to view the description of the first accomplishment;
   determine that the access rights permit the third person to view the description of the first accomplishment; and
   transmit the description of the first accomplishment to the third client computing device.

17. The computer-readable storage medium of claim 14, wherein said computer-readable instructions additionally cause the accomplishment aggregation and review computing device to:
   determine that the access rights enable the third person to make a modification to the description of the first accomplishment;
   receive a proposed modification to the description of the accomplishment from the third person; and
   apply the modification to the description of the first accomplishment.

* * * * *